United States Patent

Fertig et al.

[15] 3,642,044

[45] Feb. 15, 1972

[54] THE PRODUCTION OF POLYURETHANES EMPLOYING ORGANOPOLYMERCURIAL CATALYSTS

[72] Inventors: Joseph Fertig, Elizabeth; Seymour J. Lederer, Fairlawn, both of N.J.

[73] Assignee: Merck & Co., Inc., Rahway, N.J.

[22] Filed: May 5, 1969

[21] Appl. No.: 821,960

[52] U.S. Cl. ............... 260/77.5 AC, 117/161 KP, 252/182 R, 260/2.5 AB, 260/2.5 AC, 260/2.5 AK, 260/18 TN, 260/37 TN, 260/75 NB, 260/77.5 AB, 264/51 R
[51] Int. Cl. ........................................... C08g 22/04
[58] Field of Search .............. 260/77.5 AB, 77.5 AC, 2.5 AB, 260/2.5 AC, 75 TN, 18 TN; 252/182

[56] References Cited

UNITED STATES PATENTS 3,429,855  2/1969  Cobbledick ........................ 260/77.5

FOREIGN PATENTS OR APPLICATIONS 970,497  9/1964  Great Britain ........................ 260/77.5

Primary Examiner—Donald E. Czaja
Assistant Examiner—M. I. Marquis
Attorney—Earl R. Ross, John Frederick Gerkens and I. Louis Wolk

[57] ABSTRACT

The production of polyurethanes employing organopolymercurials as the catalytic agent. The organomercuric catalyst has the formula R—(Hg X)$_n$ wherein R is aryl, aralkyl, alkaryl, furyl, imidazolyl, oxazolyl, straight or branched alkyl or cyclic lower alkyl, or the halo, amido, lower alkozy, carboxy or nitro substituted derivatives thereof; X is an anion derived from benzoic acid, an alkanoic acid or an inorganic acid or a hydroxyl group; $n$ is an integer of 2 to 4; and the mercury atoms are bound directly to the carbon atoms of the nucleus R.

21 Claims, No Drawings

THE PRODUCTION OF POLYURETHANES EMPLOYING ORGANOPOLYMERCURIAL CATALYSTS

BACKGROUND OF THE INVENTION

The formation of polyurethane reaction products using a variety of starting reactants is well known. It is also well known that a wide variety of catalysts may be employed to facilitate the polyurethane reaction. The catalysts ordinarily used promote rapid reaction times even at ambient temperatures and, of course, this is considered quite desirable in most instances. On the other hand, there are also instances where it is deemed desirable to prolong or control the initial reaction and yet provide for a fully cured product within a relatively short period. For example, when certain polyurethane reaction products, such as polyurethane foams or elastomers, are cast in molds having intricate designs, the reaction mixture must be sufficiently fluid so that it will completely fill all voids in the mold and thus produce a product that when cured will be uniformly formed. We have found that a select group of polymercury organic compounds have the unexpected effect of promoting catalysis of polyurethane reactions having a gradual or controlled viscosity buildup and a rapid cure only after heat is applied from some source. This noted effect is quite surprising in view of the known art regarding the catalysis of polyurethane reactions with organomercurials. For example, organomonomercuric catalysts such as phenylmercuric acetate, and other classes of organopolymercury catalysts, rapidly promote the reaction of the isocyanate with, for example, hydroxyl group containing materials at relatively low temperatures.

Accordingly, the catalysts of the present invention do not provide satisfactory catalysis to form polyurethanes at ambient temperatures and are thus extremely valuable for a wide variety of applications not possible with other organomercurials.

DESCRIPTION OF THE PREFERRED EMBODIMENTS

This invention relates to the production of polyurethanes and more particularly to the catalysis of the reactions leading to the production of polyurethanes, wherein the catalysts employed are members of the class of organopolymercury salts.

According to the present invention, it has been discovered that the use of a specific class of organopolymercury salts as catalytic agents results in production of highly desirable polyurethanes. Polyurethanes are, of course, well known to the art and polyurethane articles such as films, coatings, foams, castings, elastomers, binders and adhesives are of widespread commercial importance. The polyurethane polymers prepared according to this invention find particular utility as formed foam and elastomer products.

It has now been found that certain polymercury organo compounds are valuable catalysts for the reaction of isocyanates with hydroxylic compounds. Thus, according to the present invention, there if provided a process for the manufacture of polymeric material characterized in that the reaction is carried out in the presence of members of the class of organopolymercury catalysts and heat. The catalysts of the present invention may be generally described as having the following formula:

$$R\text{-}(HgX)_n$$

wherein R is aryl, aralkyl, alkaryl, heterocyclic or straight, branched alkyl, or cyclic loweralkyl, and the halo, amido, carboxy, loweralkoxy or nitro substituted derivatives thereof; X is an anion; $n$ is an integer of 2–4 and the mercury is bound directly to the carbon atoms of the nucleus R.

Thus, when as indicated in the formula above, R is aryl such as phenyl, napthyl, anthryl, phenanthryl or alkaryl such as α-tolyl or aralkyl such as phenylethyl or phenyloctyl; the organopolymercury compounds are organo di or polymercury derivatives of mono, di, or tri carbocyclic aromatic compounds such as benzenes, napthalenes, anthracenes, and phenanthrenes, wherein the mercury is joined directly to a ring carbon or to a lower alkyl group attached to the aromatic ring. In addition, carbon atoms of the aromatic nucleus not substituted with mercury may be substituted with one or more halo (chloro, fluoro, bromo), nitro, carboxy or amido functions. Similarly, when R is loweralkyl, cyclo loweralkyl having one to six carbon atoms, or alkyl having up to 18 carbon atoms, the organopolymercury compounds are di or polymercury derivatives of alkanes or cyclo alkanes wherein the mercury atoms are attached to a different carbon on the chain and those carbons not substituted with mercury may be substituted with one or more halo, nitro, carboxy, or amido functions.

In addition, when the nucleus R is heterocyclic such as furfuryl, or imidazolyl, the carbons of the hetero ring not substituted with mercury atoms may also be further substituted as indicated above.

The anions in the formula above are derived from an organic acid exemplified by a benzoic or an alkanoic acid having one to 18 carbon atoms; or an inorganic acid exemplified by nitro, sulfuric, phosphoric acids. Thus, the anions may be of the group represented by formate, acetate, propionate, isobutyrate, octoate, oleate, palmitate, stearate, oxalate, adipate, benzoate, napthoate, nitrate, sulfate, or phosphate; or the anion may also be a hydroxyl group.

Organopolymercurial catalysts representative of the above are as follows:

2,4-bis[(formato)mercuri]benzene and the 1,2- and 1,4-bis isomers thereof
2,4-bis[(acetato)mercuri]benzene and the 1,2- and 1,4-bis isomers thereof
2,4-bis [(acetato)mercuri]-3-chlorobenzene
2,4-bis[(propionato)mercuri]benzene and the 1,2- and 1,4-bis isomers thereof
2,4-bis[(acetato)mercuri]-5-nitrobenzene
1,4-bis[(benzoato)mercuri]benzene and the 1,2- and 1,3-bis isomers thereof
2,4-bis[(benzoato)mercuri]-5-bromobenzene
1,4-bis[(benzoato)mercuri]-5-nitrobenzene
2,4-bis[(isobutyrato)mercuri]-bromobenzene and the 1,2- and 1,4-bis isomers thereof
1,4-bis[(octoato)mercuri]benzene and the 1,2- and 1,3-bis isomers thereof
2,4-bis[(sterato)mercuri]5,6-dichlorobenzene
1,2,3-tris[(propionato)mercuri]benzene
1,3,4,6-tetrakis [(propionato)mercuril]benzene
1,2,3-tris[(benzoato)mercuri]benezene
2,4-bis[(propionato)mercuri]napthalene
1,2,5,6-tetrakis[(napthenato)mercuri]napthalene
1,4,5,8-tetrakis[(propionato)mercuri]anthracene
1,6-bis[(benzoato)mercuri]phenanthrene
2,4-bis[(propionato)mercuri]-5-amido benzene
2,4-bis[(benzoato)mercuri]-5-methoxy benzene 
α,α-bix[(benzoato)mercuri]toluene
α,α-bis[(propionato)mercuri]toluene
α,α-bis[(benzoato)mercuri]-ethyl toluene
α,α-bis[(propionato)mercuri]-4-chloro toluene
α,α-bis[(benzoato)mercuri]-4-carboxy toluene
di-(mercuri benzoato)ethane
1,3-(dimercuri benzoato)propane
1,4-(dimercuri benzoato)cyclohexane
1,4-(dimercuri propionato)-5-chlorocyclohexane
3,4-(dimercuri benzoato)nonane
1,18-(dimercuri propionato)octadecane
2,4-bis[(propionato mercuri)]furan
2,3,5-tris[(benzoato mercuri)]imidazole
2,4-bis[(propionato mercuri)]5-nitroimidazole
2,4-bis[(benzoato mercuri)]oxazole Moreover, it should be noted that not only are each of the above-identified isomers and analogs useful per se in catalyzing polyurethane reactions but they are also useful when present as an isomeric mixture.

Thus the catalysts of the present invention may be broadly described as organopolymercury salts. More particularly, they may be described as polymercury derivatives of organic compounds, structurally distinguished from other polymercurials in that two or more mercury atoms are directly attached to carbon atoms of the same organic nucleus and form part of the same cationic moiety. Accordingly, as far as we have been able to ascertain, the organic nucleus and the anion can be a wide variety, the limiting factor being that at least two mercury atoms are attached directly to the organic nucleus.

The preparation of polyurethanes from polyhydroxy compounds such as polyesters, polyhydric polyalkylene ethers or polyhydric polythioethers and organic polyisocyanates and, if necessary, chain-lengthening agents such as glycols, diamines, and the like is well known.

The process of the present invention employing the organopolymercury salt catalysts is particularly valuable for the manufacture of polyurethane products by the interaction of hydroxyl group-containing polymers containing at least two isocyanate-reactive groups per molecule with organic polyisocyanates. Such polyurethane products may be prepared for example by methods and from materials fully described in the prior art, in the form of surface coatings, sheets, shaped articles including foams or adhesive layers. Thus, the hydroxyl group-containing polymer may be for example a polyester, polyesteramide or polyether, or mixtures thereof.

The preparation of the solid noncellular or cellular polyurethanes may be carried out by the general methods fully described in the prior art. As indicated previously, the polyurethane reaction is well known to those skilled in the art.

Any suitable organic polyisocyanate may be used in preparing the polyurethane. Examples of suitable polyisocyanates are disclosed in the Hoppe, et al., U.S. Pat. No. 2,764,565, and include ethylene diisocyanate, propylene-1,2-diisocyanate, cyclohexylene-1,2-diisocyanate, 2,4-tolylene diisocyanante, 2,6-tolylene diisocyanate, 3,3'-dichloro-4,4'-biphenylene diisocyanate, triphenyl methane triisocyanate, and the like, or mixtures thereof.

Other examples of suitable organic polyisocyanates include aliphatic diisocyanates such as hexamethylene diisocyanate, aromatic diisocyanates such as tolylene-2:4-diisocyanate, tolylene-2:6-diisocyanate, diphenylmethane-4:4'-diisocyanate, 3-methyldiphenyl-methane-4:4'-diisocyanate, m- and p-phenylene diisocyanate, chlorophenylene-2:4-diisocyanate, naphthalene-1:5-diisocyanate, diphenyl-4:4'-diisocyanate, 4:4'-diisocyanato-3:3'-dimethyldiphenyl and diphenyl ether diisocyanate and cycloaliphatic diisocyanates such as dicyclohexylmethane diisocyanate. Triisocyanates which may be used include aromatic triisocyanates such as 2:4:6-triisocyanato-toluene and 2:4:4'-triisocyanatodiphenyl ether. Examples of other suitable organic polyisocyanates comprise the reaction products of an excess of a diisocyanate with polyhydric alcohols such as trimethylolpropane, and isocyanurate polymers of diisocyanatos for example of tolylene-2:4-diisocyanate. Mixtures of polyisocyanates may be used. Examples of suitable mixtures include the polyisocyanate compositions obtained by the phosgenation of the mixed polyamine reaction products of formaldehyde and one or more aromatic amines such as aniline and orthotoluidine.

The foregoing polyisocyanates are utilized to prepare the polyurethane by reacting them with a sufficient amount of polyol material in the presence of the novel catalysts to produce either hydroxyl or isocyanate terminated polymers. As used herein, the term "polyol" is meant to include compounds or polymers containing two or more hydroxyl groups per molecule and include further diols, triols, tetrols, pentols, hexitols and the like and mixtures of any of these, as well as polyesters and polyethers which contain two or more hydroxyl groups per molecule. Further, the term "polyol" is meant to apply to an organic compound or mixture in which all species have two or more hydroxyl groups per molecule and no other functional groups which react at a significant rate with an isocyanate group.

Representative of the polyols which may be employed are diols such as ethylene glycol, propylene glycol, $\beta,\beta$-dihydroxy diethyl ether (diethylene glycol), dipropylene glycol, 1,4-butylene glycol, 1,3-butylene glycol; polyethers such as polypropylene glycol, polyethylene glycol, polybutylene glycol or copolymers of olefin oxides; hydroxyl-terminated polyesters such as prepared from adipic acid and diethylene glycol or from a phthalic acid and ethylene glycol; diols prepared from any transesterification between a fatty acid ester and a polyol such that a combination of diols results; and the like; compounds having more than two hydroxyl groups per molecule such as glycerine, trimethylol propane, pentaerythritol, sorbitol, $\alpha$-methyl glycoside, 1,2,6-hexametriol, castor oil, sucrose; hydroxyl-rich polyethers made by condensing ethylene oxide, propylene oxide or butylene oxide with a simple polyol such as listed above or with other polyfunctional compounds such as ethylene diamine, ethanolamine, etc. hydroxyl-rich polyesters made by condensing a dibasic acid such as adipic, succinic, sebacic, phthalic with simple diol-triol mixtures selected from the above.

The foregoing lists of polyols and polyisocyanates are intended to be merely illustrative and are not to be considered as limiting the scope of the invention. Any polyol reactable with any diisocyanate to form a urethane may be employed.

The organopolymercury salts of the present invention may be used in minor amounts or, in other words, "catalytic amounts." For most purposes, from about 0.01 to about 3.0 parts (especially 0.1–0.3) based on mercury content per 100 parts polyol or per 100 parts of organic compound having reactive hydrogen atoms are preferred. The optimum proportions, however, will necessarily depend to a considerable extent upon the particular reaction components and conditions employed.

The catalyst may be mixed with the other reactant components by any suitable means well known in the art but it has been found most advantageous to combine the catalyst material with the polyol reactant. One may also at this time incorporate into the polyol-catalyst formulation materials which are conventionally employed in polyurethane production such as fillers, pigments and reinforcing agents, blowing agents, surfactants, etc. The polyol and polyisocyanate portions are kept separate before mixing resulting in a two-part system with each part being storage stable. The temperatures at which the polyurethane reaction occurs will in general be dependent upon the nature of the starting materials used and may vary from 60° to 140° C.; preferably, 80°–100° C.

As has been previously stated, the catalysts of the present invention catalyze polyurethane reactions only at elevated temperatures. Thus, a heat source which may be of mechanical or chemical origin is necessary. In this latter aspect, we have found that any of the well known standard polyurethane catalysts which effect polyurethane reactions at ambient temperatures will serve as cocatalysts and the exothermic heat provided by the reaction will cause the organopolymercury salts to assume a catalytic role.

Examples of such catalysts include amines and metal salts such as N-methylmorphone, triethylamine, triethylene diamine, tetramethylene ethylene diamine, lead napthenate, dibutyltin dilaurate, zinc octoate and particularly lead octoate, and also polymercury organo catalysts of the type disclosed in U.S. Pat. No. 3,419,509. In addition, mercurials corresponding to the monomercurated derivatives of the present invention (such as monobenzoato mercuri benzene, monopropionato mercuri benzene and monopropionato mercuri chlorobenzene) are especially useful cocatalysts.

Accordingly, by varying the amount of so-called ambient temperature cocatalyst, it is possible to obtain a controlled polyurethane reaction without the use of mechanical heat.

In forming polyurethanes using combined formulations of organopolymercury salts and ambient temperature polyurethane catalysts the exact proportions of each present in the reaction mixture depend to a great extent on the length of time flowability is desired. Thus, except in the case of the monomercurated derivatives of the present invention, the catalysts that effect the polyurethane reaction at ambient temperatures may comprise a major or minor proportion of catalyst present in the reaction; although, regardless of the amount present for the purposes of this invention, they are still regarded as the cocatalysts. In forming polyurethanes using a mixture of organopolymercury salts and a monomercury organo salt it is desirable, for purposes of this invention, the monomercurated salt comprise at least about 25 percent of the catalytic mixture.

Table I is a tabulation of the cure rate data for those catalysts in which the gel rate was determined. In this procedure the catalyst was thoroughly mixed with a p polyol filled with 50 percent clay (Part A) and combined with mixing at various temperatures for 20 to 30 seconds with an isocyanate (Part B). The period of time prior to polymerization during which there was no significant increase of viscosity (induction period) was noted.

TABLE I

| Catalyst (based on metal/100 parts of polyol) | | Temp., °C. | Induction period (min.) |
|---|---|---|---|
| Organopolymercuri salt | Ambient Temp. cat. | | |
| Bis [(benzoatomercuri)]-benzene 0.2 | | 80 | >60 |
| Bis-[(propionatomercuri)]-benzene 0.2 | | 25 | >60 |
| Bis [(propionatomercuri)]-chlorobenzene 0.2 | | 25 | >60 |
| Bis [(benzoatomercuri)]-benzene 0.2 (mixed at 80° with Part A) | | 25 | >60 |
| Bis [(benzoatomercuri)]-benzene 0.2 | | 25 | >60 |
| Bis [(benzoatomercuri)]-benzene 0.3 | | 80 | 4.9 |
| Bis [(benzoatomercuri)]-benzene 0.1 | Mono (benzoatomercuri)-benzene 0.1. | 60 | 5 |
| | | 25 | 8 |
| Bis [(benzoatomercuri)]-benzene 0.02 | Mono (benzoatomercuri)-benzene 0.18. | 25 | 5.9 |
| Bis [(benzoatomercuri)]-benxene 0.2 | Lead octoate, 0.1 Pb | 25 | 12 |
| Do | | 80 | 6 |
| Bis [(benzoatomercuri)]-benzene 0.1 | Mono(propionatomercuri)-benzene 0.1. | 60 | 6 |
| Bis[(propionatomercury)]-chlorobenzene 0.2 | | 80 | 5 |

The organopolymercuri salts of the present invention are, for the most part, known compounds or can be made by methods well known in the art. For example in general polymercury aromatic compounds may be prepared by heating an aromatic hydrocarbon such as benzene or napthalene in the presence of excess mercuric oxide and a carboxylic acid. Polymercury aliphatic salts can be prepared by reaction of mercuric acetate with a diolefine in an alcoholic solution or alternatively by reaction of Grignard compounds with mercuric bromide; and the desired salts can be obtained by further reaction with the appropriate sodium salt in ethanol. Depending on the method used, the organopolymercury salt is obtained either in pure form or as a mixture of the various positional isomers.

EXAMPLE 1

The following example illustrates the preparation of a polyurethane which finds utility as a shaped elastomeric product. A two component system is involved in the production of the material. One component (Part A) contains reactive hydroxyl groups and the other component (Part B) contains a reactive isocyanate. The hydroxyl component is a formulation of hydroxyl containing polyoxypropylene glycol in combination with the novel catalysts of the present invention. In addition, it is well known in the art in compounding of this formulation to include fillers, colorants, process aids, etc.

Part A    26,234 g. polyoxypropylene glycol
                (molecular weight: 2200)
          25 g. Fe₂O₃
          22,680 g. Kaolin
          100 g. bis[(propionatomercuri)]benzene
Part B
3,700 g. 4,4'-
  diphenylmethane
        diisocyanate Parts A and B are reacted by flowing simultaneously through conventional mixing or blending equipment into a mold, which is then heated to 80° C. for 2 minutes.

EXAMPLE 2

The following example illustrates the preparation of a polyurethane which finds utility as a sealant.

Part A    26,000 g. polyoxypropylene glycol
                (molecular weight: 2200)
          75 g. bis[(benzoatomercuri)]-
                chlorobenzene
          25 g. lead octoate
          25 g. Fe₂O₃
          22,500 g. Kaolin
Part B    3,700 g. 4,4'-diphenylmethane
                diisocyanate Parts A and B are reacted by flowing simultaneously through conventional mixing or blending equipment to the actual place where the joining is to be effected.

We claim:

1. A method of preparing a polyurethane comprising reacting at a temperature of from 60° to 140° C. an organic polyisocyanate with an organic polyol in the presence of a catalytic amount of an organomercuric catalyst having the formula:

$$R-(HgX)_n$$

wherein R is aryl, aralkyl, alkaryl, furyl, imidazolyl, oxazolyl, straight or branched alkyl or cyclic loweralkyl, or the halo, amide, loweralkoxy, carboxy or nitro substituted derivative thereof; X is an anion derived from benzoic acid, an alkanoic acid or an inorganic acid or a hydroxyl group; n is an integer of 2 to 4; and the mercury atoms are bound directly to the carbon atoms of the nucleus R.

2. The method of claim 1 wherein R is phenyl, benzyl, furyl, or naphthyl, or the halo or nitro substituted derivatives thereof, and n is 2.

3. The method of claim 1 wherein the catalyst is bis[(benzoato)mercurie]benzene.

4. The method of claim 1 wherein the catalyst is bis[(propionato)mercuri]benzene.

5. The method of claim 1 wherein the catalyst is bis[(propionato)mercuri]chlorobenzene.

6. A method of preparing a polyurethane comprising reacting an organic polyisocyanate with an organic polyol in the presence of a minor amount of a catalyst consisting of a mixture of:

a. an organopolymercury compound having the formula $$R-(HgX)_n$$

wherein R is aryl, aralkyl, alkaryl, furyl, imidazolyl, oxazolyl, straight or branched alkyl or cyclic loweralkyl, or the halo, amido, loweralkoxy, carboxy or nitro substituted derivatives thereof; X is an anion derived from benzoic acid, an alkanoic acid or an inorganic acid or a hydroxyl group; n is an integer of 2 to 4; and the mercury atoms are bound directly to the carbon atoms of the nucleus R, and b. a cocatalyst consisting of an ambient temperature polyurethane catalyst; and when b is the monomercurated form of a, said mixture contains at least 25 percent of b.

7. The method of claim 6 wherein the cocatalyst is mono(benzoatomercuri)benzene and the organopolymercury catalyst is bis[(propionato)mercuri]benzene.

8. The method of claim 6 wherein the cocatalyst is mono(benzoatomercuri)benzene and the organopolymercury catalyst is bis[(benzoato)mercuri]benzene.

9. The method of claim 6 wherein the cocatalyst is mono(propionatomercuri)benzene and the organopolymercury catalyst is bis[(propionato)mercuri]chlorobenzene.

10. The method of claim 6 wherein the cocatalyst is mono(propionatomercuri)chlorobenzene and the organpolymercury catalyst is bis[(propionato)mercuri]chlorobenzene.

11. The method of claim 6 wherein the cocatalyst is lead octoate and the organopolymercury catalyst selected from the group consisting of bis[(propionato)mercuri]benzene, bis[(propionatomercuri)]chlorobenzene and bis[(benzoato)mercurie]benzene.

12. A composition comprising an organic polyol form 0.01 to 3.0 parts based on mercury content per 100 parts of said polyol and of a catalyst having the formula
$$R\text{-}(HgX)n$$
wherein R is aryl, aralkyl, alkaryl, furyl, imidazolyl, oxazolyl, straight or branched alkyl or cyclic loweralkyl, or the halo, amido, loweralkoxy, carboxy or nitro substituted derivatives thereof; X is an anion derived from benzoic acid, an alkanoic acid or an inorganic acid or a hydroxyl group; $n$ is an integer of 2 or 4; and the mercury atoms are bound directly to the carbon atoms of the nucleus R.

13. A composition of claim 12 where R is phenyl, benzyl, furyl, or naphthyl, or the halo or nitro substituted derivative thereof; and $n$ is 2.

14. A composition of claim 12 wherein the catalyst is bis[(benzoato)mercurie]benzene.

15. A composition of claim 12 wherein the catalyst is bis[(propionato)mercuri]benzene.

16. A composition of claim 12 wherein the catalyst is bis[(propionato)mercuri]chlorobenzene.

17. A composition comprising an organic polyol from 0.01 to 3.0 parts based on mercury content per 100 parts of said polyol and of a catalyst, said catalyst consisting of a mixture containing:
a. an organopolymercury compound having the formula
$$R\text{-}(HgX)n$$
wherein R is aryl, aralkyl, alkaryl, furyl, imidazolyl, oxazolyl, straight or branched alkyl or cyclic loweralkyl, or the halo, amido, loweralkoxy, carboxy or nitro substituted derivatives thereof; X is an anion derived from benzoic acid, an alkanoic acid or an inorganic acid or a hydroxyl group; $n$ is an integer of 2 to 4; and the mercury atoms are bound directly to the carbon atoms of the nucleus R, and
b. a cocatalyst consisting of an ambient temperature polyurethane catalyst; and when $b$ is the monomercurated form of $a$, said mixture contains at least 25 percent of $b$.

18. A composition according to claim 17 wherein the catalyst mixture consists of bis[(benzoato)mercuri]-benzene and mono(benzoatomercuri)benzene.

19. A composition according to claim 17 wherein the catalyst mixture consists of bis[(propionato)mercuri]-benzene and mono(propionatomercuri)benzene.

20. A composition according to claim 17 wherein the catalyst mixture is bis[(propionato)mercuri]chlorobenzene and mono(propionatomercuri)chlorobenzene.

21. A composition comprising an organic polyol from 0.01 to 3.0 parts based on mercury content per 100 parts of said polyol and of a mixture of lead octoate and an organopolymercury catalyst selected from the group consisting of bis[(benzoato)mercurie]benzene, bis[(propionato)mercuri]-benzene and bis[(propionato)mercuri]chlorobenzene.

* * * * *